United States Patent [19]

Nicol

[11] 4,437,138

[45] Mar. 13, 1984

[54] FORCE SENSING MEANS AND METHOD OF PRODUCING SUCH SENSING MEANS

[75] Inventor: Klaus Nicol, Adelheidstrasse 13, D-6000 Frankfurt a.M.50, Fed. Rep. of Germany

[73] Assignee: Klaus Nicol, Frankfurt, Fed. Rep. of Germany

[21] Appl. No.: 280,515

[22] Filed: Jul. 6, 1981

[30] Foreign Application Priority Data

Jul. 4, 1980 [DE] Fed. Rep. of Germany ....... 3025362

[51] Int. Cl.³ .............................................. H01G 7/00
[52] U.S. Cl. .................................... 361/283; 29/25.42
[58] Field of Search ...................... 361/283, 278, 303; 177/205 C; 174/117 F

[56] References Cited

U.S. PATENT DOCUMENTS

| | | | |
|---|---|---|---|
| 814,951 | 3/1906 | Fessenden | 361/303 |
| 3,169,022 | 2/1965 | Kretsinger | 361/278 X |
| 3,654,381 | 4/1972 | Copp | 174/117 F |
| 4,370,697 | 1/1983 | Haberl | 361/283 |

*Primary Examiner*—Donald A. Griffin
*Attorney, Agent, or Firm*—Lane, Aitken & Kananen

[57] ABSTRACT

A force sensing means comprising capacitor plates in the form of metallic cloth bonded to a compressible dielectric made from a foamed elastomeric material. An incompressible layer of insulating material may be formed over one or both of the capacitor plates and additional capacitor plate or plates may be provided bonded to the insulating layer to shield the capacitor plates bonded to the compressible dielectric. The metallic cloth strips forming the capacitor plates may be formed in the form of strips running crosswise on opposite sides of the dielectric to provide a matrix of force sensing means. The warp and weft threads of the metallic cloth are arranged so that neither is perpendicular or parallel to the longitudinal direction of the strip.

24 Claims, 11 Drawing Figures

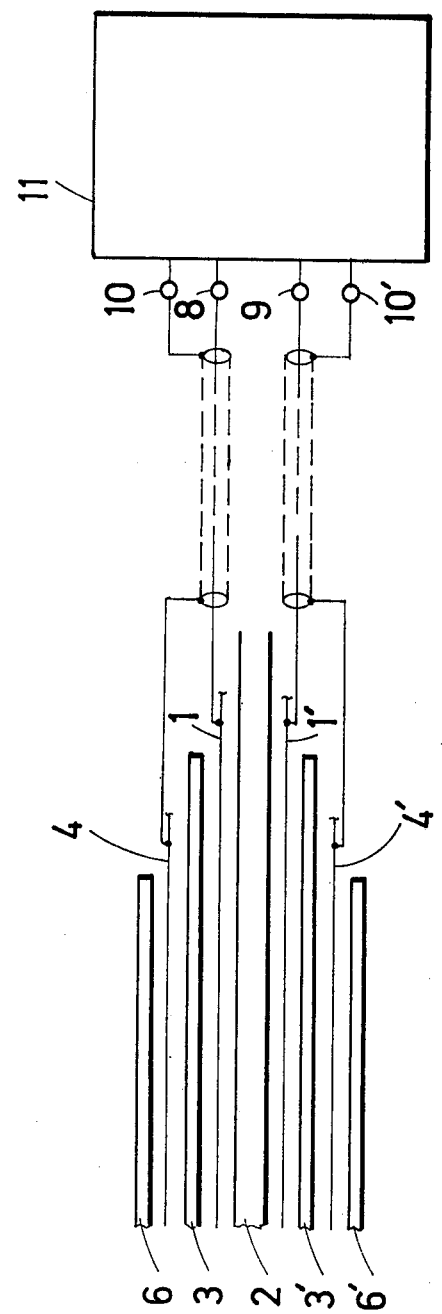

FORCE SENSING MEANS AND METHOD OF PRODUCING SUCH SENSING MEANS

BACKGROUND AND SUMMARY OF THE INVENTION

The invention relates to a force sensing means comprising a capacitor arrangement of at least two capacitor plates and a compressible dielectric.

Capacitive force sensing means with compressible dielectric have been developed because they can be made from homogeneous layers of cheap material. Thus, the labor and material costs are low and no mechanical precautions are necessary for taking into account the forces applied or for storing the material.

When such force sensing means are employed, very considerable errors in measurement occur, due to such factors as non-linearity, hysteresis, symptoms of relaxation, material fatigue, low flexibility. The force sensing means are usable only on hard flat surfaces and have short mechanical durability as well as a mechanical coupling to adjacent capacitors, such as in the force sensing means disclosed in the German published application DE-OS No. 25 29 475.

For reducing the non-linearity, the force sensing means disclosed in German Allowed application DE-AS No. 2 448 398 employs, for example, a nap-shaped dielectric and thus makes transverse extension under load possible.

Many arrangements of the capacitor plates have been known for a long period of time. For example, the plates have been formed from strong stiff sheets to achieve stiff arrangements. To make the arrangements flexible, thin sheets or metallized films have been employed. Moreover, lattice electrodes have been used to make the plates especially flexible.

To achieve force sensing means which will match curved and time-variable surfaces, it has been proposed in German published application DE OS No. 25 29 475 to coat both surfaces of the dielectric with systems of intercrossing strips of conductive material. When the force sensing means bends, the material on one surface is upset and the material on the opposite surface is extended. This occurs because the distance between the strip systems adapts itself to the conditions. The extensibility in the direction of the strips is however not increased over the normal extensibility.

For a large number of applications, particularly for measurements with respect to biological objects, the following considerations are of special importance:

1. the hysteresis, the magnitude of which is responsive to the deflection and which is therefore difficult to take into consideration.
2. the requirement, when biological objects are measured, that an automatic mechanical adaptation to the object is necessary which adaptation must also take place when the object varies its form during measurement. This adaptation requires that parts of the measurement receiver be extensible with respect to length.

The problem underlying the invention is to develop a capacitive force sensing means having a very small hysteresis and being adapted for use without special mechanical adaptation under most different circumstances including curved and time-variable measuring bodies.

To solve these problems, the force sensing means of the present invention employs capacitor plates comprising a metallic cloth, the warp threads and the weft threads of which define an angle which easily accommodates external forces and the dielectric is a macroscopically homogeneous foam elastomeric material, such as foamed elastomeric polyurethane or a foamed mixture of natural rubber and polystyrene butadiene rubber.

Macroscopically homogeneous, foamed elastomeric polyurethane and a foamed mixture of natural rubber and polystyrene-butadiene rubber are subject to a small amount of hysteresis.

The use of metallic cloth for capacitor plates has the advantage that the adhesive used for fixing the layers is pressed into the interstices in the cloth so that the cloth lies directly upon the dielectric and inhomogeneous interfaces producing hysteresis are not developed.

In order to adapt receivers automatically to curved and time-variable bodies, it is advantageous to 1. form the capacitor plates as in DE-OS No. 25 29 475 into strips and 2. to make said (electrically conductive) strips extensible. This is achieved by arranging the strips to form a metallic cloth, the angle between the warp threads and the weft threads being easy to influence by external forces. When the warp threads or the weft threads extend parallel to the direction of the strips, parallel threads can be shifted with respect to each other in longitudinal direction and the length of the strip is changed thereby. When the direction of the threads is not parallel to that of the strips, the length may be varied by changing the shape of the rectangles formed by the threads to parallelograms.

Extremely small hysteresis may be achieved particularly by polyurethane having a low degree of foaming. It is true that the low compressibility connected with low foaming degree of the capacitor formula $$C = \Delta \Delta_o F/d$$

(wherein C=capacitance, $\epsilon_o$=absolute dielectric constant, $\epsilon$=relative dielectric constant, F=capacitor surface, d=distance between the plates) results in only a small signal portion depending on the change of the distance between the plates. This drawback is, however, partly compensated by the high relative dielectric constant of about 7. Moreover, mechanical irregularies in the compression (such as irregular deformation, bursting or collapsing of the cell walls) occur only when the pressure increases, which is advantageous particularly with respect to the problem of hysteresis.

In order to avoid electric noise pick-up, it is advisable to provide additional insulating layers and additional capacitor plates which may be used as shields. In a device like that disclosed in DE-OS No. 25 29 475, this configuration is advantageous for another reason. The dielectric in this arrangement is coated on both surfaces with intercrossing strip systems of conductive material and at each cross point of two strips a capacitive force sensing means is defined. Thus, distribution of force can be measured with low expenditure. In this arrangement, the precision capacitor can be connected in series with a fixed capacitor and both can be connected to a generator so that between the two capacitors a power-responsive voltage can be measured. In this case, the fixed capacitor is formed economically by the additional insulating layer and the additional capacitor plate. The dependent claims 2 to 20 relate to advantageous structures of the insulating layers as well as of the capacitor plates which are conductive layers.

These embodiments are directed particularly at achieving greater extensibility of the layers. Therefore, even if only force, and not the distribution of force, is to be measured, it may be appropriate to cut large-area layers into strips which are connected electrically. It is likewise advantageous to make the capacitor plates of metallic fabric wherein the angle between the warp threads and the weft threads can be influenced easily by exterior forces, and not to cut the strips parallel to one direction of the thread of the metallic fabric since the extensibility of the fabric can thus be increased considerably. In the case of a cut to provide a 45° angle between the threads and the longitudinal dimension of the strip, the rectangles formed by the threads of the fabric are deformed in diagonal directions to parallelograms due to tensile stress and allow extensions of a multiple of ten percent. This is advantageous to facilitate the employment of the force sensing on uneven bodies or on bodies which are deformed during the measurement. According to DE-OS No. 25 29 475 the mechanic coupling with adjacent devices in arrangements on a hard base is reduced by extensible strips. For example, in the case of a lumped load an extensible strip adapts itself to the enlarged surface of the cone of deformation.

In the case of narrow strips and a cutting angle of 45 degrees the strip resistance increases considerably. The resistance can be reduced - by a cutting angle between 45 and 0 degrees depending on the width of the strip wherein a compromise is made between the requirements of extensibility and conductivity;

by strips of threads extending zigzag through the strips; or by coating the metallic fabric with flexible conductive lacquer or conductive glue. The only advantage of this method over the capacitor plates or conductive layers provided with conductive lacquer or conductive adhesive is the higher mechanical stability.

When the extensibility or flexibility of the force sensing means is not required, it is advantageous to make the non-conductive incompressible layer at least partly of plexiglass and to glue the force sensing means to an iron sheet to improve the mechanical stability.

For insulation on the outside of the measuring means, and for mechanical protection an additional insulating layer is applied on every outermost capacitor plate. This layer should be designed so as not to have a substantial effect on the extensibility or flexibility of extensible or flexible force sensing means. This problem is solved by employing small pieces of flexible material which overlap one another like tiles.

Advantageous methods of building up the capacitive force sensing means are described in claims 24 to 27. The adhesive must also be flexible and extensible, which properties are fulfilled to a high degree by the contact adhesive. It is applied normally on both surfaces to be glued. The surfaces—after being aired—are glued together. This technique requires homogeneity of the adhesive layer since inhomogeneities of the layer entail inhomogeneities in the basic capacity and in the force sensitivity. However, if one of the layers to be glued is a metallic fabric, the fabric can be applied on the wet adhesive layer. The adhesive which may be applied inhomogeneously is pressed through the mesh of the fabric and becomes electrically ineffective; the adhesive can be aired through the mesh of the fabric. The metallic fabric may be bonded to insulating layers by applying cyanoacrylate adhesive on the surface of the fabric which is averted from the insulating layer.

When the force sensing means is to be placed on a severely bent hard body, the force sensing means may be overstrained with respect to flexibility and extensibility. In such a case, the force sensing can be glued to the body in layers and adapted to the shape of the body. The use of contact adhesives is recommended as in the manner used to coat self-adherent films since then the sensing means can be removed in layers after use and can be used repeatedly.

When the strips have a width of a few millimeters, problems may arise with respect to production accuracy. It is advantageous to glue, for instance, the three materials used for the strips, then cut them to strips and then glue the finished strips on the dielectric. An alternative method would be to glue the dielectric prior to cutting the strips and to glue the 4-layer strips thus prepared on the second strip system.

BRIEF DESCRIPTION OF THE DRAWINGS

The drawings illustrate embodiments of arrangements according to the invention.

FIG. 1 shows an embodiment of the force sensing means connected to a capacitance/voltage transducer;

FIG. 2b shows an actual construction of the matrix system according to FIG. 2a;

FIGS. 4a' and 4b' show the fabric structure according to FIGS. 4a and 4b in the loaded state;

FIG. 1 illustrates the arrangement of the different layers comprising a force sensing means and their connection to an ungrounded capacitance/voltage transducer 11. Both surfaces of a compressible dielectric 2 are glued to capacitor plates 1,1'. The dielectric may be macroscopically homogeneous, foamed, elastomeric polyurethane, for example, "Aclatan" of Acla, Koln-Muhlheim, or it may consist of a foamed mixture of natural rubber and polystyrene butadiene rubber, e.g. CM 122 of Kopp, Aachen. Aclatan 2450 is a polyurethane with a low degree of foaming and a specific gravity of 0.5 g/cm$^3$, and so is Aclatan 2460 having a gravity of 0.6 g/cm$^3$. Insulating layers 3,3', the capacitor plates 4,4' for shielding purposes, and the additional insulating layers 6,6' for electrical and mechanical protection are arranged on said capacitor plates. The insulating layer 3,3' are incompressible. The capacitor plates are connected by shielded cables to the inputs 8,9 of the transducer 11 and the shielding layers are connected by cable shieldings to the shieldings 10,10' of the transducer.

FIG. 2a illustrates an arrangement according to DE-OS No. 25 29 475. A generator 13 supplies by a selecting switch 14 alternating voltage to the first row of the precision capacitors 15, the circuit being closed by the fixed capacitors 16. The selecting switch 17 scans the precision capacitors row by row, then the selecting switch 14 switches to the other rows of capacitors.

FIG. 2b illustrates the physical structure of the circuit arrangement according to FIG. 2a. The upper capacitor plates 18 in FIG. 2a are defined by the conductive strips 18' on the lower surface of the dielectric 2. The lower capacitor plates 19 in FIG. 2a are constituted physically by the conductive strips 19' and the upper plates 20 of the fixed capacitors 16 are constituted by the conductive strips 20' on the upper surface of the dielectric 2. Between the strips 19' and 20' an insulating layer (not shown) is arranged as dielectric of the fixed capacitor.

FIG. 3 illustrates a sectional view in transverse direction of the strip structure of a capacitor plate with shielding and fixed capacitor. The shielding layer 4 made of electrically conductive fabric or cloth is glued to the insulating layer 3 and is positioned with the edges flush with the edge of the insulating layer 3. The capacitor strip 1 made of electrically conductive fabric or cloth adjacent to the compressible dielectric (not shown in FIG. 3) is narrower than the other layers and is arranged in such a manner that on either side identical shoulders are formed. This increases the short circuit protection and shields the capacitor against contact. On both conductive layers 4 and 1, a layer of conductive lacquer 5,5' is applied only in the middle of the strips in order to avoid short circuits.

FIG. 4 shows a top view of the strip of FIG. 3. The direction of the threads of the conductive fabric forms an angle of 45 degrees with the direction of the strips.

FIG. 4a schematically shows the warp and weft thread arrangement of a fabric wherein the warp thread, when unloaded, extends parallel to the longitudinal dimensioning of the conductive strip formed by the fabric and the weft thread extends vertically thereto.

FIG. 4a' illustrates the fabric according to FIG. 4a in loaded state. All the warp threads are shifted parallel with respect to the warp thread extending at the left edge. Consequently, the weft threads do not extend vertically with respect to the warp threads, but form an angle α which is smaller than 90 degrees. This allows an extension of the strip in its longitudinal direction.

FIG. 4b illustrates the warp and weft thread arrangement defined in claim 6 and shown in FIG. 4. The fabric, which is not extended in FIG. 4b, allows a higher extension than the arrangement according to FIG. 4a. The warp threads and weft threads of the arrangement of FIG. 4b are positioned at an angle of 45 degrees with respect to the longitudinal dimension of the conductive strip. When the arrangement is loaded as illustrated in FIG. 4b', the warp threads and weft threads are shifted with respect to each other such that the angle α' is greater than 90 degrees, the diagonal in the longitudinal dimensions of the strips becoming substantially longer between the cross points d' of the threads than the diagonal between the cross points of the threads in unloaded state.

When the strip width is less than 4 millimeters, the thread direction which forms the smallest angle with the strip edge should lie in a range between 5 and 20 degrees. When the strip width is between four and ten millimeters, the thread direction which forms the smallest angle with the strip edge should be between 10 and 30 degrees. When the strip width is above 10 millimeters, the thread direction forming the smallest angle with the strip edge should be between 25 and 45 degrees.

Figure 2A:
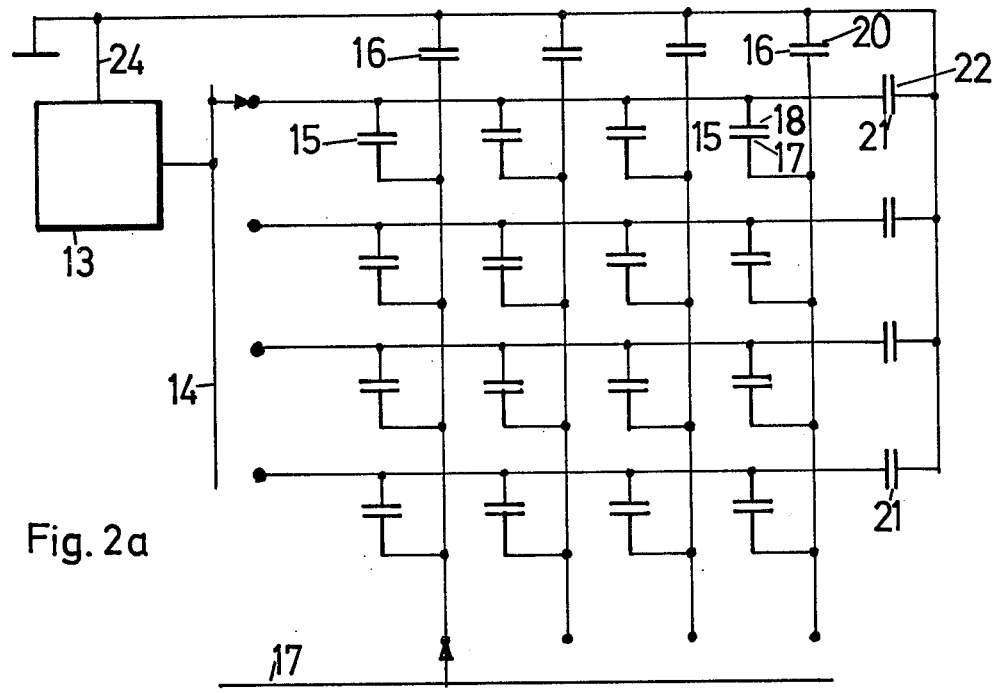
FIG. 2a is a circuit diagram showing a matrix system according to DE-OS No. 25 29 475.
Figure 2B:
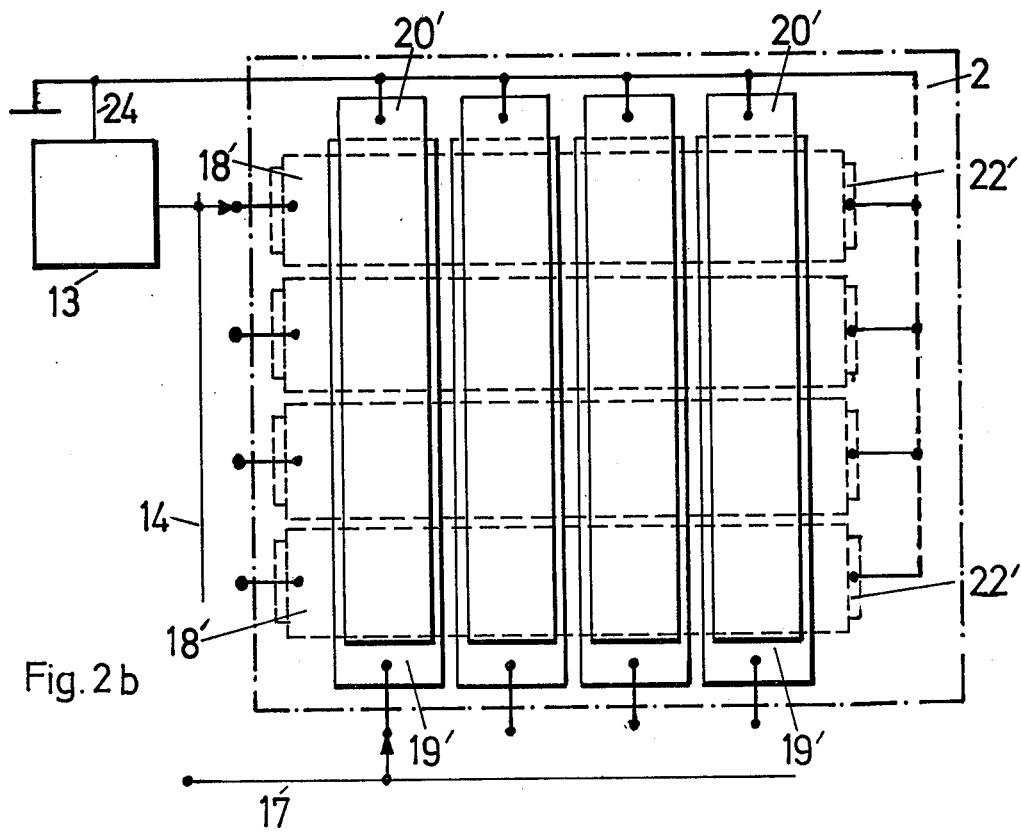
Figure 5:
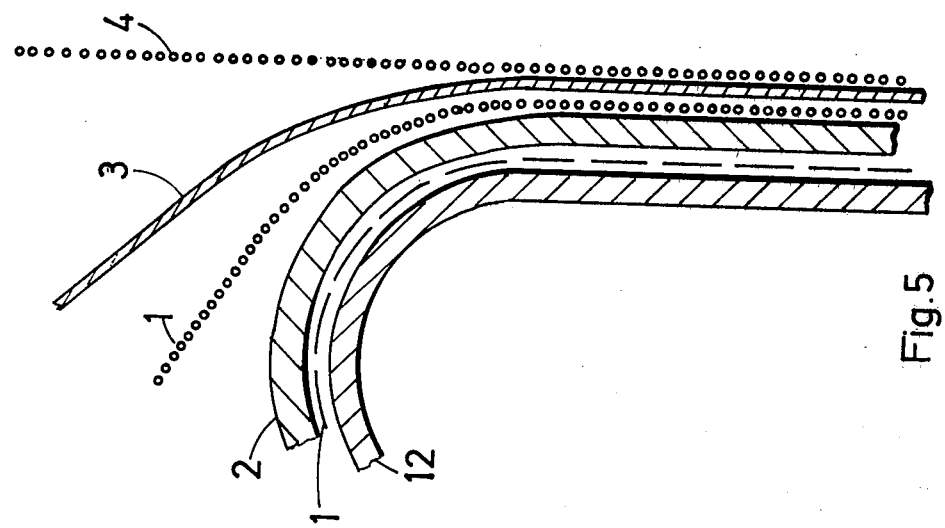
FIG. 5 shows a 4-layer strip system according to the invention.

FIG. 5 shows a sectional view of how to apply a prefabricated 4-layer strip on a severly bent body 12 for measuring the pressure distribution by means of an arrangement of DE-OS No. 25 29 475. The horizontally extended capacitor strips 1' were glued to the body 12. In the straight lower part of the body, the 4-layer strip is applied vertically in one unitary piece. In the upper bent portion of the body the four layers (dielectric 2, capacitor strip 1, insulating strip 3 and conductive strip 4) are glued individually by adhesive.

Figure 3:
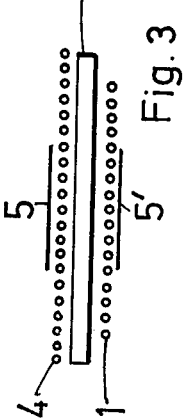
FIG. 3 is a sectional view of a strip structure of capacitor plates according to the invention.
Figure 4:
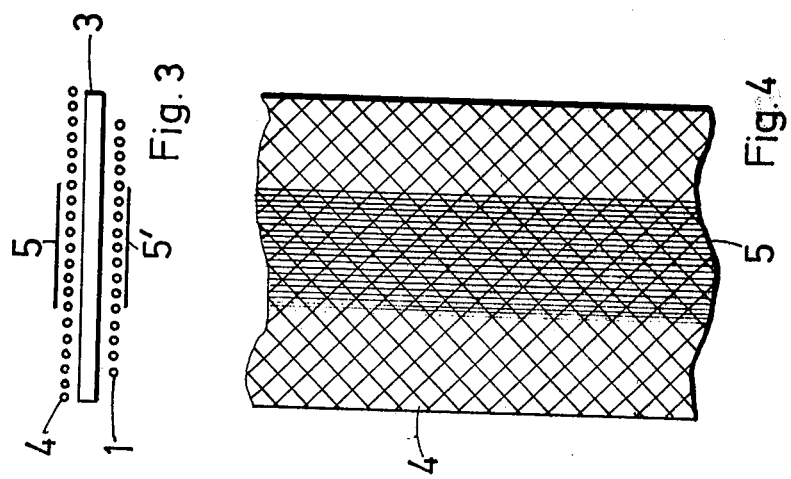
FIG. 4 is a front view of the capacitor plate system according to FIG. 3.
Figure 4A:
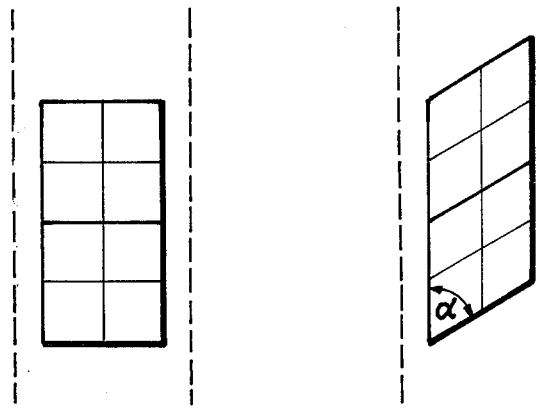
FIGS. 4a and 4b show the fabric structure for the force sensing means according to the invention in the unloaded state.
Figure 4B:
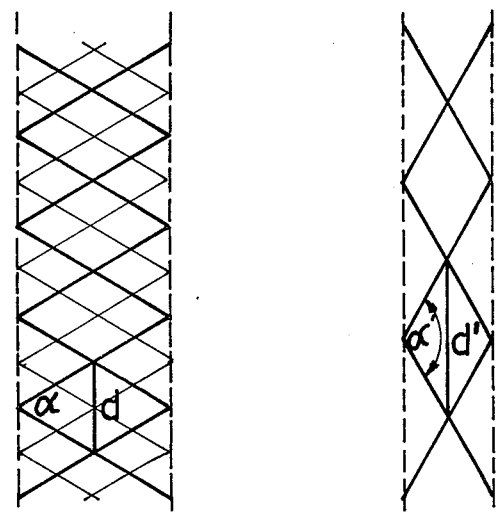
Figure 6:
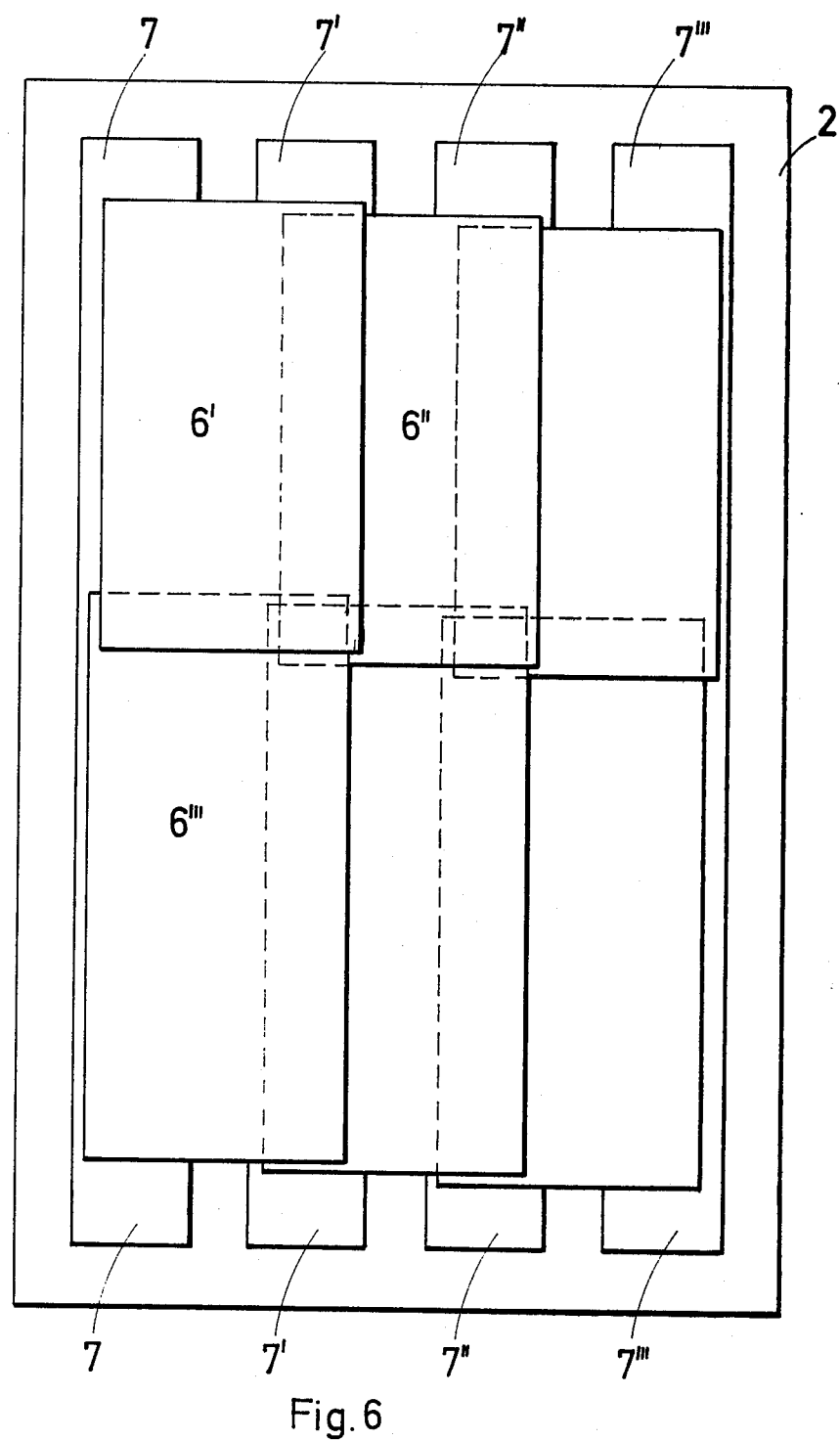
FIG. 6 is a front view of the force sensing means.

FIG. 6 shows a flexible layer made e.g., of rubber for the mechanical protection the outside of the force sensing means. Three-layer strips 7 to 7''' of FIG. 3 are arranged on the dielectric 2. The covering strip 6' made of rubber or other elastomeric material is fixed to the strip 7 and overlaps the covering strip 6'' fixed to the strip 7' as well as the covering strip 6''' fixed to the strip 7 like tiles.

What is claimed is:

1. A force sensing means comprising a capacitor arrangement of at least two capacitor plates and one compressible dielectric between at least two of said capacitor plates, the improvement wherein the capacitor plates are a metallic cloth, the warp threads and the weft threads of which define an angle which yields to the influence of external forces, and the dielectric is a macroscopically homogeneous, foamed, elastomeric material.

2. In a force sensing means according to claim 1, wherein the dielectric is a polyurethane having a low degree of foaming with a specific gravity of between 0.4 g/cm$^3$ and 0.6 g/cm$^3$.

3. In a force sensing means according to claim 1, wherein one surface or both surfaces of the capacitor plate or the capacitor plates which are not in contact with the compressible dielectric are insulated by incompressible insulating layers.

4. In a force sensing means according to claim 3, wherein the insulating layer or the insulating layers are flexible and extensible.

5. In a force sensing means according to claim 3, wherein the capacitor plates and the insulating layer or layers are narrow strips.

6. In a force sensing means according to claim 5, wherein the capacitor plates and the insulating layer or layers have the same width and are glued with the edges thereof flush.

7. In a force sensing means according to claim 5, wherein the insulating layer or layers and capacitor plates which do not contact the compressible dielectric have the same width and are glued with the edges thereof flush, and the capacitor plates which contact the dielectric have a smaller width and are glued with the insulating layers so that the latter are overlapping on either side to the same degree.

8. In a force sensing means according to one of the claims 1–7 wherein the warp threads and the weft threads of said cloth each extend parallel to one another and the weft threads of said cloth extend parallel to one another.

9. In a force sensing means according to one of the claims 1–7 wherein the warp threads as well as the weft threads define an angle with the strip edge not equal to zero.

10. In a force sensing means according to claim 9, wherein the strip width is less than 4 millimeters and the thread direction forming the smallest angle with the strip edge lies in the range between 5 degrees and 20 degrees.

11. Force sensing means according to claim 9 wherein the strip width is between 4 millimeters and 10 millimeters and the thread direction forming the smallest angle with the strip edge lies in the range between 10 degrees and 30 degrees.

12. Force sensing means according to claim 9 wherein the strip width is greater than 10 millimeters and the thread direction forming the smallest angle with the strip edge lies in the range between 25 degrees and 45 degrees.

13. In a force sensing means according to claims 1–7, wherein the force sensing means is glued to a metallic plate.

14. In a force sensing means according to one of the claims 3–7, wherein the insulating layer or the insulating layers are made of a hard material.

15. In a force sensing means according to claim 14, wherein at least one of the insulating layers are made of plexiglass.

16. In a force sensing means according to claim 14, wherein the outer insulating layers are divided by a cut extending transversely in the strip direction, and that the portions separated by said cut overlap one another.

17. In a force sensing means according to claim 5 wherein the metallic threads of the cloth in one strip are not interrupted.

18. In a force sensing means according to claim 17 wherein the metallic threads of the cloth are woven zigzag.

19. In a force sensing means according to claim 5 wherein the metallic cloth of the strips is covered with flexible conductive lacquer or flexible conductive adhesive.

20. In a force sensing means according to one of the claims 3–7 and 17–19, wherein the outer insulating layers project in transverse direction beyond the underlying capacitor plates on at least one side and overlap those of the adjacent strip like tiles.

21. In a force sensing means according to claims 1–7 and 17–19 wherein the capacitor plates contacting the compressible dielectric are connected to the inputs of an ungrounded capacitance/voltage transducer and further comprising capacitor plates shielding said first mentioned capacitor plate and connected to the shielding of said transducer.

22. In a force sensing means as recited in claim 1 wherein said dielectric is macroscopically homogeneous foamed elastomeric polyurethane.

23. In a force sensing means as recited in claim 1 wherein said dielectric is a foamed mixture of natural rubber and polystyrene-butadiene rubber.

24. A force sensing means comprising a capacitor arrangement of at least two capacitor plates and one compressible dielectric between at least two of said capacitor plates, the improvement wherein the capacitor plates are a metallic cloth and the dielectric is selected from the group consisting of macroscopically homogeneous, foamed, elastomeric polyurethane and a foamed mixture of natural rubber and polystyrene-butadiene rubber.

* * * * *